United States Patent [19]
Orlando et al.

[11] Patent Number: 5,748,230
[45] Date of Patent: May 5, 1998

[54] AUTOMATED MINIMUM RESOLVABLE CONTRAST (AMRC) TEST

[75] Inventors: Harold J. Orlando, Costa Mesa; Michael L. Pappas, Anaheim; Marco A. Lopez, Villa Park, all of Calif.

[73] Assignee: Northrop Grumman Corporation, Los Angeles, Calif.

[21] Appl. No.: 549,587

[22] Filed: Oct. 27, 1995

[51] Int. Cl.$^6$ .......................... H04N 17/00; H04N 17/02
[52] U.S. Cl. .................. 348/187; 348/175; 348/176; 348/188
[58] Field of Search ..................... 348/175, 176, 348/187, 188, 252, 253, 744; H04N 17/00, 17/02

[56] References Cited

U.S. PATENT DOCUMENTS

| | | | |
|---|---|---|---|
| 3,912,396 | 10/1975 | Hartmann | 356/124 |
| 4,299,451 | 11/1981 | Task et al. | 350/407 |
| 4,568,975 | 2/1986 | Harshbarger | 358/139 |
| 4,951,141 | 8/1990 | Fischer | 358/139 |
| 5,033,015 | 7/1991 | Zwirn | 364/579 |
| 5,136,388 | 8/1992 | Sano et al. | 358/213.18 |
| 5,155,558 | 10/1992 | Tannenbaum et al. | 356/446 |
| 5,285,286 | 2/1994 | Kannegundla | 348/187 |
| 5,351,201 | 9/1994 | Harshbarger, Jr. et al. | 364/551.01 |
| 5,572,444 | 11/1996 | Lentz et al. | 348/181 |

OTHER PUBLICATIONS

"Basics of Detection, Recognition, and Identification in Electro–Optical Formed Imagery", F.A. Rossell et al., of Westinghouse Electric Corp., Proc. SPIE, Sep. 1972, p. 118.

*Primary Examiner*—John K. Peng
*Assistant Examiner*—Vivek Srivastava
*Attorney, Agent, or Firm*—Terry J. Anderson; Karl J. Hoch, Jr.

[57] ABSTRACT

A system for automatically performing the Minimum Resolvable Contrast (MRC) test on an image sensor, such as a TV camera, using a digital signal processor for controlling the testing, wherein an edge response from a square aperture target edge is used to generate a Modulation Transfer Function (MTF) which, in combination with signal and noise data obtained using the square aperture target, provides an input to automated MRC (AMRC) processing equations, from which a value can be calculated for an AMRC output. Alternatively, a slit target may be substituted for the square target aperture when measuring camera MTF.

20 Claims, 2 Drawing Sheets

AUTOMATED MINIMUM RESOLVABLE CONTRAST (AMRC) TEST

BACKGROUND OF THE INVENTION

1. Field of the Invention

The present invention relates to the testing of electronic image sensing or camera systems and more particularly to a method and means for automating the existing Minimum Resolvable Contrast (MRC) test.

2. Problem to be Solved

The presently used Minimum Resolvable Contrast (MRC) test involves a test observer who views variable contrast bar charts through a TV camera to determine the lowest contrast at which all bars in a 3-bar chart of a given frequency can be resolved. This MRC test suffers from the drawbacks of requiring a trained observer to obtain meaningful results and of the inaccuracy of results due to variations among observers. An automated test system that standardizes the test results would be desirable, and especially one that is comparatively simple and inexpensive. The present test also requires the use of an expensive variable contrast target projector.

PRIOR ART

An example of a prior system for projecting variable contrast targets is found in U.S. Pat. No. 4,299,451 to H.L. TASK ET AL., wherein test image patterns are created for video sensors being tested to detect their minimum contrast resolution, which detection may be with a human observer. Test images are input to the sensor and a separate detector, beam splitters, and polarizers provide feedback on the test image contrast. Other prior art systems directed to automating the testing of image sensors and cameras include: U.S. Pat. No. 5,033,015 to R. ZWIRN, which discloses a lookup table with addresses that are a function of the signal and noise components of the test sensor output but with data that is dependent upon input derived from human observers, and is used to determine Minimum Resolvable Temperature rather than Minimum Resolvable Contrast; U.S. Pat. No. 5,285,286 to R. KANNEGUNDLA, which discloses a system that produces a test image for a CCD sensor being tested for display without a frame store, but which ultimately requires an observer; U.S. Pat. No. 5,136,388 to Y. SANO ET AL, which discloses the use of a frequency distribution profile developed from the cells of the image sensor being tested and that is compared with a standard profile without an observer to locate camera defects, but does not address contrast. U.S. Pat. No. 4,568,975 to H.H. HARSHBARGER, JR., ET AL. and U.S. Pat. No. 5,351,201 to J.H. HARSHBARGER, JR., both involve systems for testing the characteristics of electronic display devices, such as a CRT display, using test patterns not requiring an observer.

None of the prior art systems offer a comparatively simple and inexpensive means and method for testing the MRC of electronic image sensors, such as TV cameras, and particularly without the need for an observer and insuring a desired accuracy.

OBJECTS

It is an object of the present invention to provide a method and means for overcoming the drawbacks to the existing MRC test with simpler and much less costly test equipment.

It is another object of the invention to provide a method and means for automating the existing MRC test obviating the need for a specially trained observer.

It is a further object of the invention to provide a method and means for automating the existing MRC test to obtain more accurate, predictable qualifications of TV camera systems at lower cost of testing.

SUMMARY OF THE INVENTION

The foregoing and other problems are overcome and the objects of the invention are realized by a system for automatically performing the Minimum Resolvable Contrast (MRC) test on an electronic image sensor or video camera using a digital signal processor for controlling the testing, wherein an edge response from a square aperture target edge, or alternatively an impulse response from a thin slit target, is used to generate a Modulation Transfer Function (MTF) from which, in combination with DC signal data, noise data, and developed automated MRC (AMRC) processing equations, values can be calculated for an AMRC output. More particularly, a square aperture target with fixed contrast is used for producing a test image to be sensed by the camera and is adapted to produce a number of frames of the test image at different luminance levels. Signals, indicative of an image frame, output by the camera in response to sensing a test image, are processed in means that sense the signal and noise characteristics and target edge, or thin slit, image quality and produce DC response and noise data and target data signals indicative thereof. The DC response, noise and target data signals are collected and processed for a number of image frames at different target luminance levels and signals are output indicative of the collected data. The collected data signals are then used to produce an AMRC output signal obtained by calculating automated MRC values, AMRC(N), with the following equation:

$$AMRC(N) = SNR_{TH} \left[ \frac{\alpha}{2\Delta f_v t \epsilon} \right]^{1/2} \frac{N}{R_{SF}(N)}$$

$$\frac{\left[ \beta_T(N) \frac{(2 - AMRC(N))}{2} (V_{total}^2 - V_P^2) + V_P^2 \right]^{1/2}}{V_{SIG}}$$

where:

$SNR_{th}$ is threshold signal to noise ratio;

$\Delta f_v$ is video bandwidth (Hz);

t is observer eye integration time (sec);

$\epsilon$ is target bar aspect ratio (length to width, 5:1 for a 3-bar target with 2 intervening gaps);

$\alpha$ is display aspect ratio (width to height);

N is target frequency (TV lines per picture height);

$R_{SF}(N)$ is system square wave response (measured only at one luminance level);

$$\beta_T(N) = \frac{\int_0^N |R_{OT}(N)|^2 dN}{N}$$

is noise filter function in the periodic direction, i.e., perpendicular to the target bars, where $R_{OT}(N)$ is the sine wave response of components after the noise insertion point (detector readout, electronics and display);

$V_{SIG}$, is the mean signal voltage at the target luminance level relative to the dark level;

$V_{total}$, is the total rms noise at the target luminance level; and $V_p$, is the rms noise at the dark level, including all noise components not due to signal.

BRIEF DESCRIPTION OF THE DRAWINGS

The above set forth and other features of the invention are made more apparent in the ensuing "Detailed Description of the Invention" when read in conjunction with the attached Drawings, wherein.

DETAILED DESCRIPTION OF THE INVENTION

The present invention is directed to providing a method and means for testing electronic image sensors and camera systems by automating the known Minimum Resolvable Contrast (MRC) test and particularly automating measurements of the signal and noise characteristics of television cameras. In the known MRC test, a test observer views variable contrast bar charts through a TV camera to determine the lowest contrast at which all bars in a 3-bar chart of a given frequency can be resolved. This test has drawbacks such as requiring a trained observer to obtain meaningful results, inaccuracy due to variations among observers, and requiring the use of an expensive variable contrast target projector. The invention overcomes the drawbacks of the current MRC test with simpler and much less costly test equipment. Further, the test of the invention is automated, and therefore does not require a specially trained observer. The resulting benefits are more accurate, predictable qualification of TV camera systems at lower cost of testing.

The automated MRC (AMRC) tester of the invention makes automatic measurements of the signal and noise characteristics of television cameras and is particularly suitable for use in testing and checking out such cameras and comparing the results to MRC design predictions. The MRC test is used to estimate TV camera target recognition and detection range field performances. AMRC test results can be substituted for those of the MRC test in range performance models to improve the accuracy of range predictions.

Figure 1:
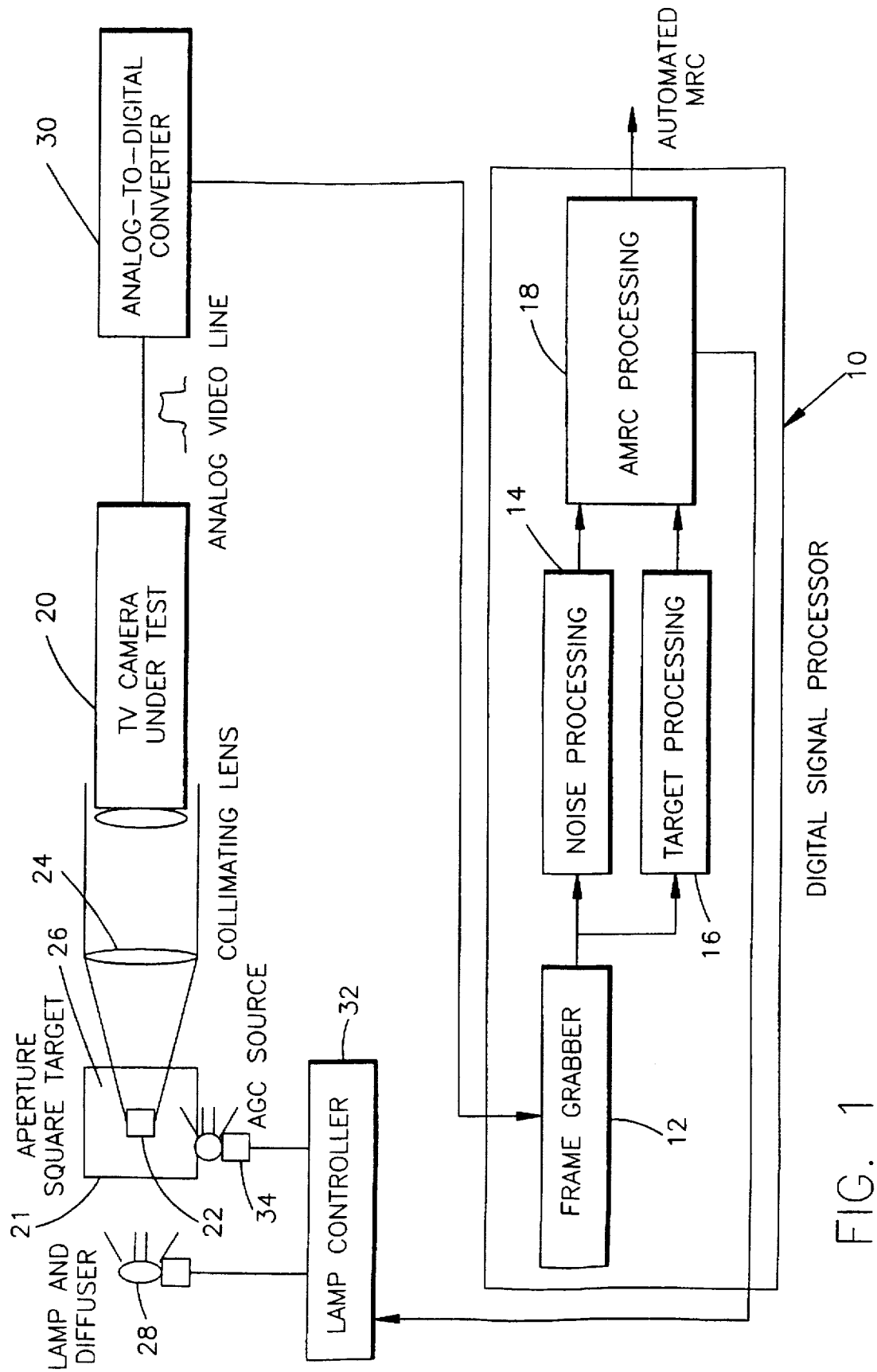
FIG. 1 is a block diagram of an automated minimum resolvable contrast (AMRC) tester, using a square aperture target, in accordance with the invention.
Figure 2B:
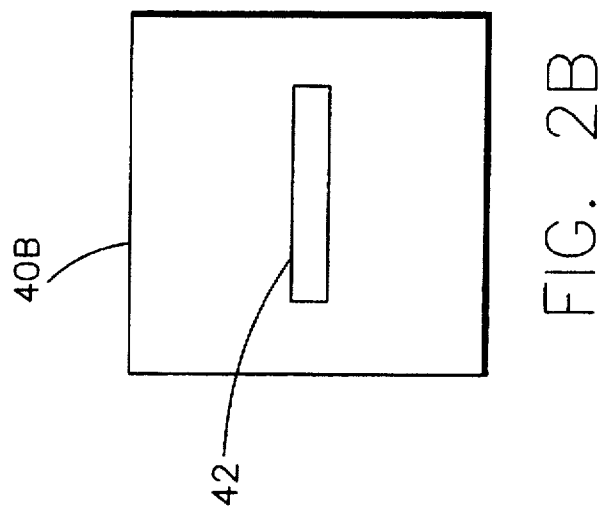
FIGS. 2a and 2b illustrate a vertical slit target and a horizontal slit target, respectively, which may be substituted for the square aperture target of FIG. 1 for MTF testing.
Figure 2A:
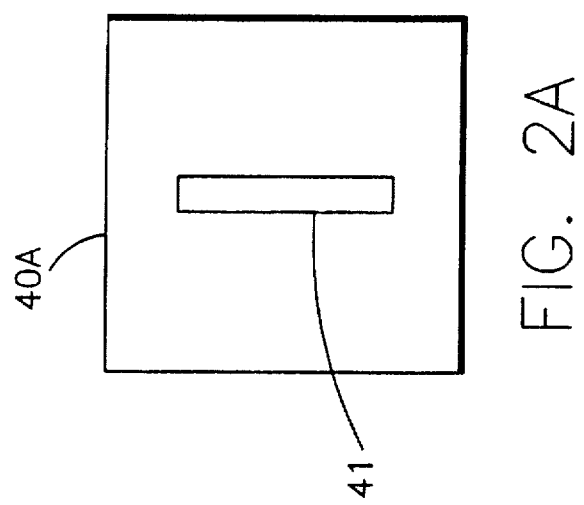

An AMRC tester in accordance with the invention is shown in FIG. 1. The testing operation is controlled by a Digital Signal Processor 10 which contains a Frame Grabber component 12, a Noise Processing unit 14, a Target Processing unit 16, and a unit 18 for completing the automatic minimum resolvable contrast (AMRC) processing. The TV camera 20 being tested views a square aperture target 22 through a collimating lens 24. The square aperture target 22 is illuminated by a lamp 28 through a diffuser to provide uniform illumination. The output of the TV camera 20 is input to an Analog-to-Digital converter 30 to prepare it for signal processing. In the signal processor 10 a frame of video from A/D converter 30 is stored in Frame Grabber 12 for processing. The frame is processed for noise characteristics in Noise Processing unit 14 and for target edge or slit image quality in Target Processing unit 16. Alternatively, targets 40a and 40b, such as shown in FIGS. 2a and 2b, with thin vertical and horizontal slit source apertures, 41 and 42, respectively, may be substituted in place of the square aperture target 22 for MTF measurements. The data from units 14 and 16 is collected and processed over a number of frames, using various lamp illumination levels, in AMRC unit 18 until enough data is obtained to calculate and output the automated MRC values. AMRC unit 18 then outputs a signal indicative of the MRC values along with a feedback signal to a lamp controller 32 for regulating the illumination from lamp 28 and an Automatic Gain Control (AGC) clamping light source 34.

Signal and Noise Processing

As will be seen in FIG. 1, the MRC values are measured using a target 21 having a bright square aperture 22 against a dark background 26. The signal and noise voltages produced by the illumination from the square aperture target 21 are then measured at the video output of the camera 20 under test, using signals indicative thereof output for signal processing. After the signals are processed through A/D converter 30 and frame grabber 12, noise is measured in unit 14 as a function of the target illumination brightness using the standard deviation over the target region. The resulting output signal from unit 14 then is indicative of the difference between the mean brightness of the target region and the mean brightness of the background region with the illumination source turned off. It consists of DC response and noise data. In unit 16, any one of the target aperture edges will provide an edge response, or alternatively an impulse response will be provided with a slit target, for the measure of image quality, which is called the Modulation Transfer Function (MTF). The MTF is obtained by computing in unit 16 the magnitude of the Fourier Transform of the differentiated edge response, or of the undifferentiated slit response, at the output of the camera. The MTF output is transformed to a square wave response using the Fourier expansion for the square wave. These parameters, DC response, noise, and MTF, are then input to the AMRC processing unit 18 which outputs the calculated automated MRC values.

The MRC values may be automatically determined for various background light levels by changing the target brightness. Part of this process involves determining whether or not the target brightness is in the linear region of operation of the TV camera being tested. If the test target image does not fill the camera's Automatic Gain Control (AGC) window, the camera gain will be set too high and the target illumination will saturate the camera output. If this condition is detected, an additional adjustable large area light source outside of the target, i.e., the AGC source 34 in FIG. 1, is activated to correct this condition.

When one of the narrow aperture or slit targets 41 or 42, in FIGS. 2a and 2b, is used for the MTF measurement, it can be introduced before or after the initial square aperture target measurement is taken. The vertical slit measurement is the baseline since horizontal resolution is most often measured. When vertical resolution is desired, the horizontal slit MTF measurement is performed. Slit targets will normally offer a noise advantage over the square aperture target edge for MTF measurements. However, it does require the switching of targets during measurement, and many different size slits are needed to test a range of image sensors with different resolution capabilities. Only a few square aperture targets are needed to test the same broad range of imaging sensors.

AMRC Processing

The signal processing in AMRC processing unit 18 utilizes equations developed from the work of F. A. Rosell and R. H. Willson of Westinghouse Electric Corporation in "Basics of Detection, Recognition, and Identification in Electro-Optical Formed Imagery", Proc. SPIE, September 1972, p. 118. Accordingly, the displayed Signal to Noise Ratio, $SNR_{DI}$, for a periodic test pattern with three vertical bars and two intervening gaps having a 5:1 length to width ratio is given by the following equation:

$$SNR_{DI} = \left[ \frac{t\epsilon}{\alpha e} \right]^{1/2} \frac{R_{SF}(N)}{N} \frac{2MG_T i_{av}}{[G_T^2 \beta_T(N) i_{av} + I_s]^{1/2}} \quad \text{(Equation 1)}$$

where:

t is observer eye integration time (sec);

ε is target bar aspect ratio (length to width, 5:1 for standard 3-bar chart with 2 intervening gaps);

α is display aspect ratio (usually 4/3);

e is electron charge (Coulombs);

N is target frequency (TV lines per picture height);

$R_{SF}(N)$ is system square wave response;

M is modulation contrast (max−min)/(max+min);

$G_T$ is signal gain between photosurface and preamp;

$i_{av}$ is average target and background photocurrent (A);

$I_s$ preamp current (A); and $$\beta_T(N) = \frac{\int_0^N |R_{OT}(N)|^2 dN}{N}$$

is noise filter function in the periodic direction, perpendicular to the target bars, where $R_{OT}(N)$ is the sine wave response of components after the noise insertion point (detector readout, electronics and display).

Solving for modulation contrast (M) gives the following:

$$M(N) = SNR_{DI} \left[ \frac{\alpha e}{t\epsilon} \right]^{1/2} \frac{N}{R_{SF}(N)} \frac{[G_T^2 \beta_T(N) i_{av} + I_s]^{1/2}}{2G_T i_{av}} \quad \text{(Equation 2)}$$

All of the parameters are known or can be measured directly except the noise terms. To get this equation into a usable form it is put in terms of measured noise quantities and universal contrast (C) rather than modulation contrast (M).

Universal contrast, C, is defined as maximum input brightness minus minimum brightness divided by maximum brightness, where maximum brightness is the target or the background brightness whichever is greater. Universal contrast, C, can then be written in terms of modulation contrast, M, as:

$$C=2M/(1+M) \quad \text{(Equation 3)}$$

Likewise, M can be written in terms of C:

$$M=C/(2-C) \quad \text{(Equation 4)}$$

$$C=M/(2-C) \quad \text{(Equation 5)}$$

An explicit expression for minimum resolvable contrast, MRC, can be obtained by substituting Equation 2 into Equation 3, but the result is cumbersome. Instead, by substituting Equation 2 into Equation 5 a simpler equation is obtained. When contrast is replaced with minimum resolvable contrast, and displayed SNR, $SNR_{DI}$, is replaced with threshold SNR, $SNR_{TH}$, an expression for MRC is:

$$MRC(N) = SNR_{TH} \left[ \frac{\alpha e}{t\epsilon} \right]^{1/2} \frac{N}{R_{SF}(N)} \frac{[G_T^2 \beta_T(N) i_{av} + I_s]^{1/2}}{2G_T i_{av}} (2-C) \quad \text{(Equation 6)}$$

The use of a constant threshold display Signal to Noise ratio ($SNR_{TH}$), rather than one which is a function of contrast, is justified by the fact that the observer performing the MRC test adjusts the display brightness and contrast controls to optimize the contrast.

To express the noise components in terms of measurable terms at the video output the following substitutions are made:

$I_{AV} = G_T i_{av}$
$I_p^2 = 2eI_s \Delta f_v$
$I_{av}^2 = 2ei_{av} \Delta f_v G_T^2$ where, $I_{AV}$ is the average of target and background current (A);

$I_p$ is rms preamp noise at the preamp input (A);

$I_{av}$ is rms shot noise at the preamp input (A); and $\Delta f_v$ is video bandwidth (Hz); thus, $$MCR(N) = \quad \text{(Equation 7)}$$

$$SNR_{TH} \left[ \frac{\alpha}{2\Delta f_v t\epsilon} \right]^{1/2} \frac{N}{R_{SF}(N)} \frac{[\beta_T(N)I_{av}^2 + I_p^2]^{1/2}}{2I_{av}} (2-MRC(N))$$

The MRC can also be expressed as measured voltages at the video output by a gain scaling which cancels in the numerator and denominator. The currents are then expressed in their corresponding voltages:

$$MRC(N) = \quad \text{(Equation 8)}$$

$$SNR_{TH} \left[ \frac{\alpha}{2\Delta f_v t\epsilon} \right]^{1/2} \frac{N}{R_{SF}(N)} \frac{[\beta_T(N)V_{av}^2 + V_p^2]^{1/2}}{2V_{AV}} (2-MRC(N))$$

Since the total noise is measured, rather than its components, a methodology is used which allows the calculating of the separate noise components. This is done by measuring the noise over the dark background region (system and preamplifier noise only) as well as over the target region (system preamplifier and signal induced noise). This can also be done by measuring signal and noise voltages as a function of target brightness. Noise due to the signal ($V_{AV}$) is then solved for. All of the terms in Equation 8 are known or measured. $\beta_T(N)$, the noise filter function, is calculated for the system under test. The automated MRC (AMRC) is measured at the video output of the camera, therefore the display is not included in the measurement. An assumed or specified display may be included in $\Delta_T(N)$. $\Delta_T(N)$ is a function which is near unity at frequencies within the system bandpass and can be supplied as a precalculated function.

The MRC in Equation 8 is not in the final form needed for AMRC. By using Equation 5, the expression for M may be written as:

$$M(N) = SNR_{TH} \left[ \frac{\alpha}{2\Delta f_v t\epsilon} \right]^{1/2} \frac{N}{R_{SF}(N)} \frac{[\beta_T(N)V_{av}^2 + V_p^2]^{1/2}}{2V_{AV}} \quad \text{(Equation 9)}$$

The next step is to express modulation in terms of signal voltage as used in the automated test rather than average voltage for a bar target. They can be related using the definition of contrast given above:

$$C=(V_{MAX}-V_{MIN})/V_{MAX} \quad \text{(Equation 10)}$$

$V_{MAX}$ is defined as the signal voltage, which is called $V_{SIG}$, and $V_{MIN}$ is defined as the background voltage. Since, $V_{AV}=(V_{SIG}+V_{MIN})/2$, $V_{AV}$ can be solved for in terms of C and $V_{SIG}$:

$$V_{AV}=(2-C)V_{SIG}/2 \quad \text{(Equation 11)}$$

By substituting Equation 11 into Equation 9:

$$M(N) = SNR_{TH} \left[ \frac{\alpha}{2\Delta f_v \pi} \right]^{1/2} \frac{N}{R_{SF}(N)} \frac{[\beta_T(N)V_{av}^2 V_p^2]}{(2-C)V_{SIG}}$$ (Equation 12)

AMRC is defined as the contrast in terms of M using Equation 5:

$$AMRC(N) = M(N)(2-C)$$ (Equation 13)

The AMRC is computed by calculating M(N) and substituting into Equation 10 to obtain:

$$AMRC(N) = SNR_{TH} \left[ \frac{\alpha}{2\Delta f_v \pi} \right]^{1/2} \frac{N}{R_{SF}(N)} \frac{[\beta_T(N)V_{AV}^2 + V_p^2]^{1/2}}{V_{SIG}}$$ (Equation 14)

The equation derived for AMRC, Equation 14, needs to be expressed in terms of the measured quantities for the automated test. The following quantities are measured over a range of target luminance levels:

$$AMRC(N) = SNR_{TH} \left[ \frac{\alpha}{2\Delta f_v \pi} \right]^{1/2} \frac{N}{R_{SF}(N)}$$

$V_{SIG}$, the mean signal voltage at the target luminance level relative to the dark level;

$V_{total}$, the total rms noise at the target luminance level;

$V_p$, the rms noise at the dark level (includes all noise components not due to signal); and $R_{SF}(N)$, the square wave response (measured only at one luminance level).

The other terms (except $V_{av}$) are input parameters to the test and are separately input to the MRC processor calculating the MRC equation. The noise term, $V_{av}$, which varies with target luminance and contrast is derived from the noise measurements $V_{total}$ and $V_p$. Since the noise due to the average signal is not measured, but rather that due to the peak target signal is (a square aperture target with fixed contrast is used rather than a bar chart with variable contrast), noise must be expressed in terms of $V_{total}$ which is the rss of $V_{SIG}$ and $V_p$.

The equations for the signal currents from which the noise terms are derived are used first. The signal voltage $V_{AV}$ is related to $V_{SIG}$ by contrast, as shown before in Equation 11 from which the equivalent equation in terms of current is derived:

$$i_{AV} = (2-C)i_{SIG}/2$$ (Equation 15)

The noise current due to the average current is as follows:

$$I_{av}^2 = 2ei_{av}\Delta f_v G_T^2$$ (Equation 16)

where, $i_{AV}$ = average of target and background current (A);

$I_{av}$ is rms shot noise at the preamp input (A);

$\Delta f_v$ is video bandwidth (Hz); and $G_T$ is the photocurrent gain.

Substituting Equation 15 in Equation 16 the noise current is converted from that due to the signal current:

Now replacing currents with the corresponding voltages:

$$V_{av}^2 = \frac{(2-C)}{2} (V_{sig}^2)$$ (Equation 17)

-continued $$V_{av}^2 = \frac{(2-C)}{2} (V_{total}^2 - V_p^2)$$

$$I_{av}^2 = (2-C)ei_{SIG}\Delta f_v G_T^2$$

$$= \frac{(2-C)}{2} (2ei_{SIG}\Delta f_v G_T^2)$$

$$= \frac{(2-C)}{2} I_{sig}$$

Equation 17 is in terms of the measured noise term and contrast and can be substituted into Equation 14 to calculate AMRC in terms of the measured quantities.

$$AMRC(N) = SNR_{TH} \left[ \frac{\alpha}{2\Delta f_v \pi} \right]^{1/2} \frac{N}{R_{SF}(N)} \frac{\left[ \beta_T(N) \frac{(2-AMRC(N))}{2} (V_{total}^2 - V_p^2) + V_p^2 \right]^{1/2}}{V_{SIG}}$$ (Equation 18)

Equation 18 is the formulation implemented in the AMRC processing unit 18 for calculating and producing the AMRC outputs.

Thus, an automated system is provided for measuring the minimum resolvable contrast of an image sensor, such as a TV camera, using comparatively few and simple components and procedures, and obviating the need for any human observer.

What is claimed is:

1. Apparatus for automatically performing the Minimum Resolvable Contrast (MRC) test on an image sensor, such as a TV camera, comprising:

target means for producing a test image to be sensed by said image sensor under test;

luminance means for illuminating said target means and producing a number of frames of said test image at different luminance levels for input to said image sensor;

means for processing video signals, indicative of an image frame, output by said image sensor in response to sensing a test image frame from said target means, comprising:

means for sensing DC response and noise characteristics from said image frame indicative video signals and producing DC response and noise data signals indicative thereof;

means for sensing said image frame indicative video signals and generating a Modulation Transfer Function (MTF) signal in response thereto; and means for collecting and processing said noise and target data signals and said MTF function signal for a number of image frames at different target luminance levels and outputting signals indicative of said collected signals;

means, using said collected signals, for calculating the values $$AMRC(N) = SNR_{TH} \left[ \frac{\alpha}{2\Delta f_v \pi} \right]^{1/2} \frac{N}{R_{SF}(N)}$$

-continued $$\frac{\left[\beta_T(N)\frac{(2-AMRC(N))}{2}(V_{total}^2-V_p^2)+V_p^2\right]^{1/2}}{V_{SIG}}$$

and producing an automated MRC output signal indicative of said values, where:

$SNR_{TH}$ is threshold signal to noise ratio;
$\Delta f_v$ is video bandwidth (Hz);
t is observer eye integration time (sec);
$\epsilon$ is target bar aspect ratio (length to width);
$\alpha$ is display aspect ratio;
N is target frequency (TV lines per picture height);
$R_{SF}(N)$ is system square wave response (measured only at one luminance level);

$$B_T(N) = \frac{\int_0^N |R_{OT}(N)|^2 dN}{N}$$

is noise filter function perpendicular to the target bars, where $R_{OT}$ (N) is the sine wave response of components after the noise insertion point;
$V_{SIG}$, is the mean signal voltage at the target luminance level relative to the dark level;
$V_{total}$, is the total rms noise at the target luminance level; and
$V_p$, is the rms noise at the dark level, including all noise components not due to signal.

2. Apparatus as in claim 1 wherein said means for processing video signals indicative of an image frame further comprises a Frame Grabber.

3. Apparatus as in claim 1 further comprising a digital signal processor including said means for processing video signals indicative of a test image frame.

4. Apparatus as in claim 3 wherein said digital signal processor also includes said means for calculating the value AMRC(N).

5. Apparatus as in claim 1 wherein said means for calculating the value AMRC(N) and producing said automated MRC output signal further comprises means, responsive to said AMRC output signal, for controlling said luminance means for producing a number of frames of said test image at different luminance levels.

6. Apparatus as in claim 1 wherein said luminance means for producing a number of frames of said test image at different luminance levels comprises a lamp and diffuser for illuminating said target means and an Automatic Gain Control (AGC) clamping illumination source.

7. Apparatus as in claim 6 wherein said means for calculating the value AMRC(N) and producing said automatic MRC output signal further comprises means, responsive to said AMRC output signal, for controlling said AGC clamping illumination source.

8. Apparatus as in claim 1 wherein said means for processing video signals indicative of an image frame further comprises an A/D converter.

9. Apparatus as in claim 1 wherein said target means comprises a square aperture target and said means for generating an MTF signal comprises:

means for obtaining an edge response from one of the edges of said square aperture target; and
means for producing a target data signal, comprising:

means for obtaining a Modulation Transfer Function (MTF) by computing the magnitude of the Fourier Transform of the differentiated edge response at the output of the image sensor; and
means for transforming the MTF signal to a square wave response using the Fourier expansion for the square wave.

10. Apparatus as in claim 1 wherein said target means comprises a square aperture target and said means for sensing noise characteristics from said frame signals and producing noise data signals indicative thereof comprises means for measuring noise as a function of the target brightness using the standard deviation over the target region and producing noise data signals indicative thereof.

11. Apparatus as in claim 1 wherein said target means comprises a square aperture target and said means for sensing DC response characteristics from said frame signals and producing DC response data signals indicative thereof comprises means for determining the difference between the mean of the brightness of the square aperture target region and the mean of the brightness of the background region.

12. Apparatus as in claim 1 wherein said target means comprises a slit target means with thin vertical and horizontal slit source apertures and said means for generating an MTF signal comprises:

means for producing an image quality data signal comprising a Modulation Transfer Function (MTF) obtained by computing the magnitude of the Fourier Transform of the slit response at the output of the image sensor; and
means for transforming the MTF signal to a square wave response using the Fourier expansion for the square wave.

13. A method for automatically performing the Minimum Resolvable Contrast (MRC) test on an image sensor, such as a TV camera, comprising the steps of:

providing a source of luminance and a square aperture target with fixed contrast for producing an image to be sensed by said image sensor;

processing an image frame, output by said image sensor in response to the sensing of an image from said target, for DC response and noise characteristics and a Modulation Transfer Function based on target edge or slit image quality and producing data signals indicative thereof;

collecting and processing said data signals for a number of image frames using different target luminance levels and outputting signals indicative of said collected data signals; and using said signals indicative of said collected data signals to calculate the values for $$AMRC(N) = SNR_{TH}\left[\frac{\alpha}{2\Delta f_v t\epsilon}\right]^{1/2}\frac{N}{R_{SF}(N)}$$

$$\frac{\left[\beta_T(N)\frac{(2-AMRC(N))}{2}(V_{total}^2-V_p^2)+V_p^2\right]^{1/2}}{V_{SIG}}$$

and producing an output signal indicative thereof, where $SNR_{TH}$ is threshold signal to noise ratio;
$\Delta f_v$ is video bandwidth (Hz);
t is observer eye integration time (sec);
$\epsilon$ is target bar aspect ratio (length to width);
$\alpha$ is display aspect ratio;

N is target frequency (TV lines per picture height);

$R_{SF}(N)$ is system square wave response (measured only at one luminance level);

$$B_T(N) = \frac{\int_0^N |R_{OT}(N)|^2 dN}{N}$$

is noise filter function perpendicular to the target bars, where $R_{OT}$ (N) is the sine wave response of components after the noise insertion point;

$V_{SIG}$, the mean signal voltage at the target luminance level relative to the dark level;

$V_{total}$, the total rms noise at the target luminance level; and $V_p$, the rms noise at the dark level, including all noise components not due to signal.

14. The method of claim 13 wherein the step of processing an image frame for noise characteristics comprises measuring noise as a function of the target brightness using the standard deviation over the target region and producing a data signal indicative thereof.

15. The method of claim 13 wherein the indicative data signal produced from the step of processing an image frame for DC response characteristics comprises a signal indicative of the difference between the mean of the brightness of the target region and the mean of the brightness of the background region.

16. The method of claim 13 wherein the step of processing an image frame for target edge image quality comprises obtaining an edge response from one of the edges of said square aperture target.

17. The method of claim 16 wherein the indicative data signal produced from the step of processing an image frame for target edge image quality comprises a signal indicative of the Modulation Transfer Function (MTF) obtained by computing the magnitude of the Fourier Transform of the differentiated edge response at the output of the image sensor; and further comprising the step of transforming the MTF signal to a square wave response using the Fourier expansion for the square wave.

18. The method of claim 13 wherein the step of processing an image frame for slit image quality comprises providing a target comprising a slit target means with thin vertical and horizontal slit source apertures.

19. The method of claim 18 wherein the indicative data signal produced from the step of processing an image frame for slit image quality comprises a signal indicative of the Modulation Transfer Function (MTF) obtained by computing the magnitude of the Fourier Transform of the slit response at the output of the image sensor; and further comprising the step of transforming the MTF signal to a square wave response using the Fourier expansion for the square wave.

20. Apparatus for automatically performing the Minimum Resolvable Contrast (MRC) test on an image sensor, such as a TV camera, and producing a test value, comprising:

a square aperture target means with fixed contrast for producing a first test image to be sensed by said image sensor;

a slit target means with thin vertical and horizontal slit source apertures for producing a second test image to be sensed by said image sensor;

means for varying the illumination of said square aperture and said slit target means to produce a number of frames of said first and second test images at different luminance levels;

means for processing signals, indicative of said test image frames, output by said image sensor in response to sensing test image frames from said square aperture target means and from said slit target means, comprising:

means for sensing noise characteristics from said test image frame signals output in response to sensing a first test image frame from said square aperture target means and producing DC response and noise data signals indicative thereof;

means for sensing slit image quality from said test image frame signals output in response to sensing a second test image frame from said slit target means and producing Modulation Transfer Function (MTF) data signals indicative thereof;

means for collecting and processing said DC response, noise, and MTF data signals for a number of test image frames at different target luminance levels and outputting signals indicative of said collected data; and means, using said collected data signals, for calculating the values for $$AMRC(N) = SNR_{TH} \left[ \frac{\alpha}{2\Delta f_v t \epsilon} \right]^{1/2} \frac{N}{R_{SF}(N)}$$

$$\frac{\left[ \beta_T(N) \frac{(2 - AMRC(N))}{2} (V_{total}^2 - V_p^2) + V_p^2 \right]^{1/2}}{V_{SIG}}$$

and producing an output signal indicative of said values as said test values, where:

$SNR_{TH}$ is threshold signal to noise ratio;

$\Delta f_v$ is video bandwidth (Hz);

t is observer eye integration time (sec);

$\epsilon$ is target bar aspect ratio (length to width);

$\alpha$ is display aspect ratio;

N is target frequency (TV lines per picture height);

$R_{SF}(N)$ is system square wave response (measured only at one luminance level);

$$B_T(N) = \frac{\int_0^N |R_{OT}(N)|^2 dN}{N}$$

is noise filter function in the periodic direction, where $R_{OT}(N)$ is the sine wave response of components after the noise insertion point;

$V_{SIG}$, is the mean signal voltage at the target luminance level relative to the dark level;

$V_{total}$, is the total rms noise at the target luminance level; and $V_p$, is the rms noise at the dark level, including all noise components not due to signal.

* * * * *